United States Patent [19]

Dingle

[11] Patent Number: 4,888,714

[45] Date of Patent: Dec. 19, 1989

[54] SPECTROMETER SYSTEM HAVING INTERCONNECTED COMPUTERS AT MULTIPLE OPTICAL HEADS

[75] Inventor: Larry A. Dingle, Laguna Niguel, Calif.

[73] Assignee: Laser Precision Corporation, Irvine, Calif.

[21] Appl. No.: 100,985

[22] Filed: Sep. 25, 1987

[51] Int. Cl.$^4$ .......................... G01J 3/42; G06F 15/20
[52] U.S. Cl. .................................... 364/525; 364/138; 356/346
[58] Field of Search ............... 364/525, 496, 497, 498, 364/132, 138; 356/346

[56] References Cited

U.S. PATENT DOCUMENTS

| | | | |
|---|---|---|---|
| 4,008,388 | 2/1977 | McLafferty et al. | 364/498 |
| 4,140,394 | 2/1979 | Roos | 364/498 |
| 4,293,222 | 10/1981 | Caruso et al. | 364/498 |
| 4,304,001 | 12/1981 | Cope | 364/132 |
| 4,365,303 | 12/1982 | Hannah et al. | 364/498 |
| 4,399,502 | 8/1983 | MacDonald et al. | 364/189 |
| 4,443,861 | 4/1984 | Slater | 364/189 |
| 4,590,574 | 5/1986 | Edmonds et al. | 356/346 |
| 4,660,151 | 4/1987 | Chipman et al. | 364/498 |

OTHER PUBLICATIONS

Chou et al, Computer-Controlled Auger Spectrometer, 5/1976, pp. 559-564.
Herring et al, Digital Acquisition of EPR Spectra Using a Microprocessor, 5/1979, pp. 413-419.
Zweibaum, Fully-Integrated On-Line Process Control System Employing Microcomputer-Based IR Spectrometer, 1979, pp. 91-106.
Hot et al, System for the Automatic Analysis of Interferograms Obtained by Holographic Interferometry, 1979, pp. 144-151.
Stumpf, Real-Time Interferometer, 1978, pp. 42-50.
Kunz et al, A Computerized System for Instrument Automation and Laboratory Management, 9/1976, pp. 71-76, 78-83.
Wood, Local Area Network Standards, 1985, pp. 263-280.

Primary Examiner—Parshotam S. Lall
Assistant Examiner—V. Trans
Attorney, Agent, or Firm—Thomas J. Plante

[57] ABSTRACT

A spectrometer system is disclosed in which a plurality of computers are linked by cable carrying serial electronic signals. At least one control computer, and at least one optical head computer are linked by a local area network system (LAN), which includes means for parallel-to-serial signal conversion of the outgoing signals at each computer, and means for serial-to-parallel signal conversion of the incoming signals at each computer. The system permits remote control of multiple optical heads, a characteristic which is particularly important in process control and environment monitoring situations.

7 Claims, 4 Drawing Sheets

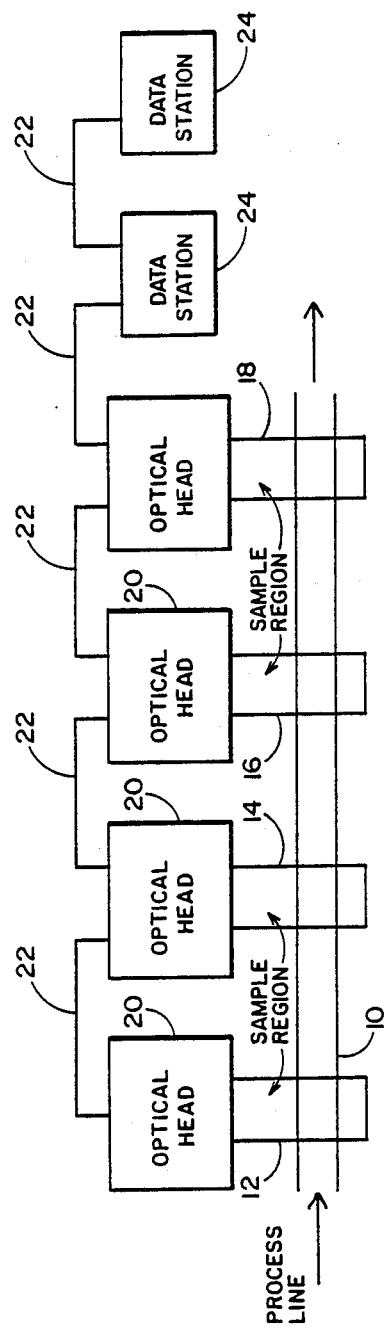
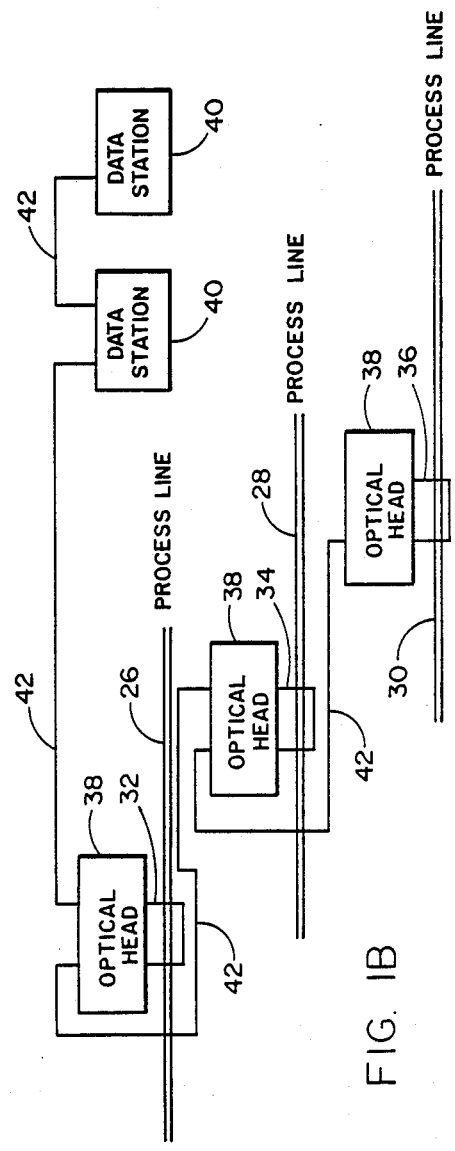
FIG. 1A
FIG. 1B ical head from a CPU by a distance as long as 3,000 ft.
SPECTROMETER SYSTEM HAVING INTERCONNECTED COMPUTERS AT MULTIPLE OPTICAL HEADS

BACKGROUND OF THE INVENTION

This invention relates to the data acquisition components of spectrometer systems, and deals particularly with the computer interface system needed if a plurality of spectral scanning units are to be combined in a single spectrometer system, and if the spectral scanning units need to be located at substantial distances from one another and/or from the main control computer(s).

In a spectrometer system, a single computer unit has traditionally been used to provide both data-acquisition control and data-manipulation. This is accomplished by combining, in effect, two processors in one box. These processors, often referred to as "A" and "B" processors, are provided with a high speed parallel interface. The "B" processor controls data acquisition at the interferometer; and the "A" processor controls processing (including Fourier transform) of the data received from the interferometer.

Although the present invention is useful in any complex spectrometer systems, including laboratory systems, its development was motivated primarily by the problems of process monitoring situations, and of harsh duty quality control situations.

The user needs most often voiced in these situations are: reliability, ruggedness, vibration tolerance, insensitivity to ambient temperature variations, acceptable cost, and the ability to operate the optics remotely from the computer hardware. If feasible, major benefits would be provided by systems which permit using multiple, remotely located optical heads [remote from the central processing unit (CPU), and remote from one another]. Such optical heads may be located in crowded or hazardous environments, with the CPU in a remote and benign atmosphere, e.g., a control room. In some situations, it is desirable to permit separation of an optical head from a CPU by a distance as long as 3,000 ft.

In an effort to solve the problems encountered in process monitoring environments, the separation of the A and B data processors was tried by the assignee of the present application. A data acquisition control processor was included in each of a plurality of separate optical heads remotely located at various process observation points. One or more CPU computers were used to interface with the remote optical heads. Providing efficient intercommunication of the remote optical heads with the CPU(s) became a significant problem.

In approaching this problem, applicant's first effort was to extend the length of the existing parallel linking system sufficiently to provide the desired remote control. This would have avoided the complications involved in translating information from parallel to serial, and then back to parallel again. The data rates with such serial connections were considered too low, and the costs too high.

However, after a period of experimentation, it was determined that the parallel linking plan had many problems, including reliability problems, time of flight delays from the CPU out to the end of the line and back, and problems in making a multiple drop (where one CPU could communicate simultaneously with more than one optical head).

Another roadblock encountered was the standard approach to CPU control of multiple local computers, which involved transmitting back and forth signals from the CPU to each local computer on a separate line (a "spokes in the wheel" architecture). This type of system is not efficient because of the very long aggregate signal travel distances involved.

SUMMARY OF THE INVENTION

The present invention includes, for the first time, a spectral analysis system in which a plurality of remote optical heads, each having its own data processor and interferometer, are linked, on a full-time basis, with one or more CPUs which (a) instruct the remote optical heads, and (b) analyze the data returned from the optical heads.

The present invention also involves the adaptation to spectrometer systems of electronic control nodes which permit a multiplicity of computer units to be linked in series, and permit each computer unit to communicate with any other computer unit, without requiring the intervention of a third computer unit.

The computer-to-computer links carry serial signals, not parallel electronic signals. At each node (one of which is required at each computer), a serial-to-parallel converter is required for incoming data, and a parallel-to-serial converter is required for outgoing data.

The serial connection from one node to the next node is provided by a single twinax cable. The cable is isolated at each node, preferably by a transformer. Each computer station has an amplifier on the computer side of the transformer, which reconstitutes possibly weak incoming signals. The cable is the sole computer linking entity, and it is linear, i.e., it starts at the first computer and ends at the last computer.

The present invention permits high speed data communications in spectrometer systems, such as process control or environmental monitoring systems, in which relatively long distances, and high levels of electrical noise, are involved.

BRIEF DESCRIPTION OF THE DRAWINGS

FIGS. 1A and 1B show diagrammatically exemplary, or typical, applications of the present invention to real-time process control (or quality analysis) systems incorporating multiple spectrometer stations;

DETAILED DESCRIPTION OF SPECIFIC EMBODIMENT

Figure 2:
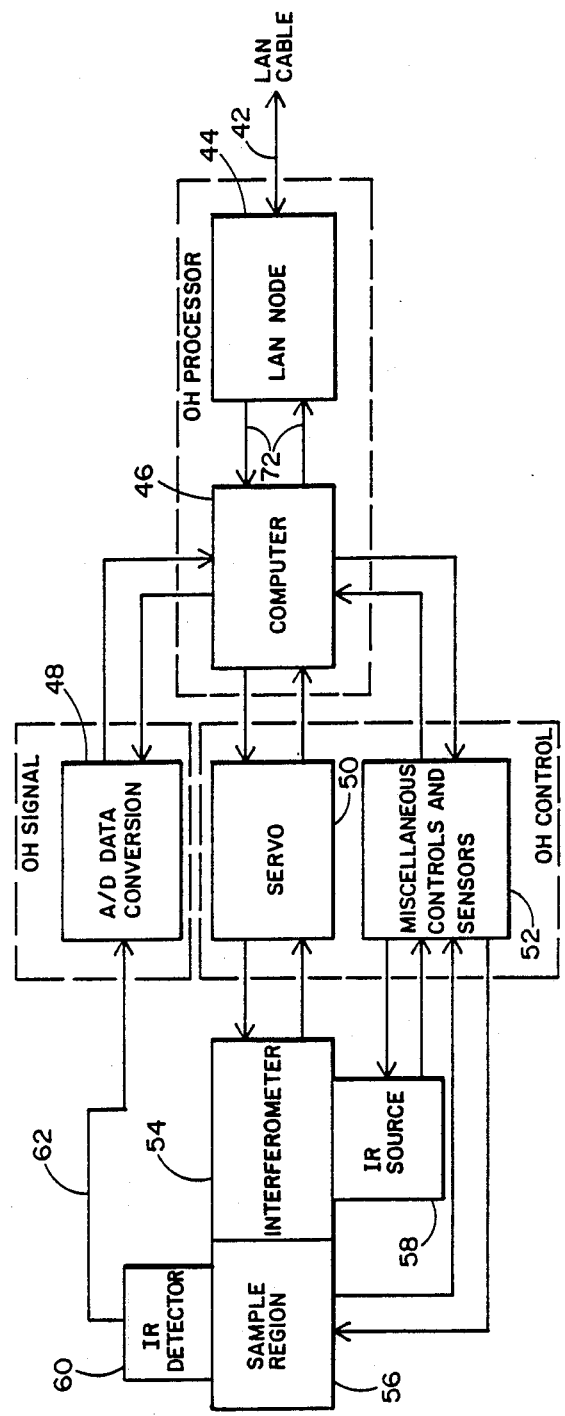
FIG. 2 shows diagrammatically an optical head sub-system, suitable for use at each of the spectrometer stations of FIG. 1.

FIG. 1A illustrates a highly sophisticated spectral analysis system usable as a real-time process control system. A common process line 10 is shown, which might be a conduit carrying all or part of the processed material. This material may be analyzed at a plurality of sample regions. Sample region 12 is termed an "incoming inspection" point; sample regions 14 and 16 are termed "intermediate monitoring" points; and sample region 18 is termed a "final inspection" point.

Each of the four sample regions has a sperate optical head 20. Each optical head 20 is connected to the next optical head by a single local area network (LAN) cable 22. Two additional LAN cables 22 are shown linking the optical heads to a pair of data stations 24, one of which may be the main control computer, and the other a backup control and monitoring computer.

Signals carried by the LAN cables are serial signals; and the cables are twinax cables, i.e., comprising two wires twisted around one another, and enclosed in a shield. Any of the six computers (provided in each optical head and each data station) may send signals to, and receive signals from, any of the other computers. The addresses and frame signatures incorporated into such signals determine their effect. All six of the computers are designed to deal with parallel signals; so each interface of a computer with a LAN cable incorporates parallel-to-serial and serial-to-parallel signal conversion.

The system of FIG. 1B is similar to that of FIG. 1A, except that FIG. 1B has a plurality of parallel process lines 26, 28 and 30, each of which is analyzed at a separate sample region 32, 34 and 36. A separate optical head 38 is located at each sample region; and two data stations 40 are provided. Each optical head computer and each data station computer is connected to the next computer by a single LAN cable 42. The function of the system in FIG. 1B is to permit simultaneous real time monitoring of several process lines.

Various systems other than process control systems can benefit from the present invention. One possibility is the use of several different optical heads that respond to different frequency ranges of the spectrum. A potassium bromide (KBr) optical head might be set up for one type of experiment, a calcium fluoride optical head for a different type, and so on. Another possibility is to have different sorts of accessories permanently set up, such as a microscope permanently set up in the sample region. A further possibility, which is essentially an industrial application, but not process control, would be ambient air monitoring, e.g., it might be necessary to monitor gas emissions around the periphery of a production plant; and because of the size of the plant, two or more optical heads separated by quite large distances might be needed.

FIG. 2 shows the spectrometer system which constitutes each optical head. The LAN cable 22/42 handles both incoming and outgoing signals at the optical head. A multi-function LAN node 44 (which will subsequently be described in detail) has two-way communication both with the LAN cable, and with an optical head computer 46. As shown by the dashed line rectangle, LAN node 44 and computer 46 are considered to constitute the optical head processor.

The computer 46, which is the heart of the optical head electronics system, has two-way communication with each of three sub-systems: an A/D data conversion unit 48, a servo motor control unit 50, and a unit 52 including miscellaneous controls and sensors. As shown by the dashed line rectangles, the two units 50 and 52 are considered to constitute the optical head control; and the A/D conversion unit 48 handles the optical head signal.

The optical portion of the spectrometer system at each sampling region comprises an interferometer 54, a sample-containing region 56, a radiation (usually infrared) source 58, and a detector (usually infrared) 60.

The computer 46 is a dedicated (embedded) computer, which is designed specifically for inclusion in an optical head. It is preferably a single board computer. It provides driving instructions to, and receives feedback information from, the servo motor unit 50. The motor unit 50 is responsible for controlling the motion of the scanning element in the interferometer, which may be either a moving mirror or a moving refractive wedge. Feedback from the interferometer moving element to the motor 50 provides a motion control loop.

The controls and sensors unit 52, which is in communication with computer 46, has two-way connection with the sample region 56, and with the infrared (IR) source 58. Through this unit 52, the optical head computer can tell the source what intensity of radiation should be used. It can sense if the source has burned out. It can determine which of several available beam baths the IR energy from the interferometer follows to reach the infrared detector. It can select which detector channel (if a plurality are available) is to be active. These are functions that are ultimately controlled from the general purpose computer at a data staion 24; but the local control loops perform the controls and sense the conditions.

In a process application, there might be a need to monitor a thick sample of the material in order to look for a weak band, and to monitor a thin sample of the material in order to look for a very strong band. So one sample path would pass through a transmission cell having an appreciable amount of material moving through it. Another beam path would pass through an ATR cell, where the path length is very small. The computer could alternate between the two cells and their respective detector channels, in order to extract more information from the sample.

An additional need for alternative modes of operation can result from use of a modular spectrometer system having several sample illumination units simultaneously hooked up, and ready to be used selectively at the option of the operator. Such modular systems are described in common assignee Application Ser. No. 900,730, filed Aug. 27, 1986.

The IR detector 60 (which may be one of several) outputs an analog signal on line 62 to the A/D data conversion unit 48. Data conversion unit 48 outputs parallel digital bytes to computer 46, whenever the computer instructs the conversion unit to do so. Computer 46 also instructs conversion unit 48 when to perform the data conversion. By performing the analog-to-digital conversion at the optical head, the need to transmit microvolt level signals on the twinax cable is avoided (a task which such a cable is not well qualified to perform). In earlier spectrometer systems, the data conversion unit was included in the general purpose data station computer, rather than the optical head.

Figure 3:
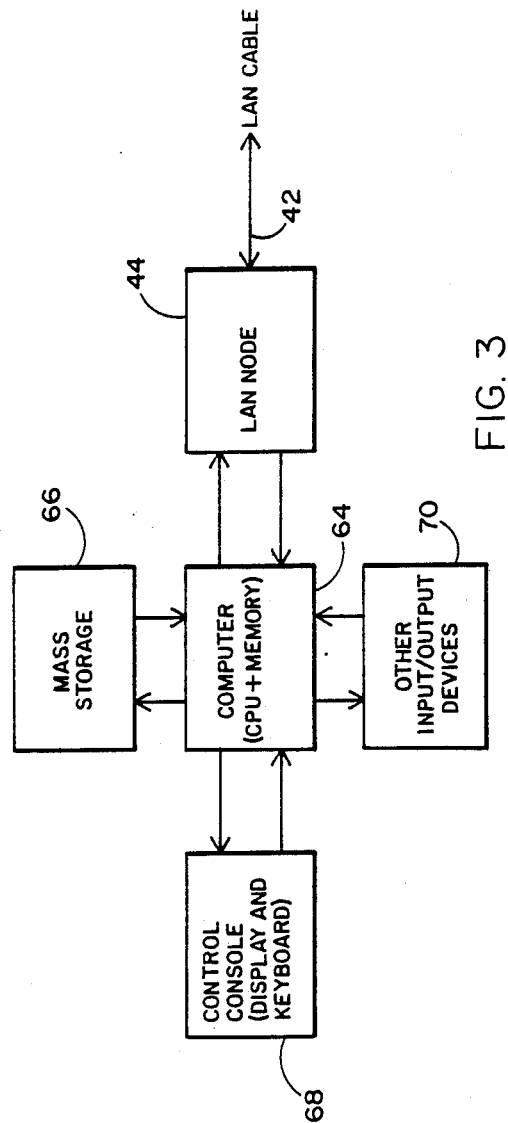
FIG. 3 shows diagrammatically a typical data station sub-system, suitable for use in the system of FIG. 1.

FIG. 3 shows a data station, which is preferably a high performance general purpose computer, e.g., a PC-AT. This computer has a central processing unit (CPU) 64, which is the heart of the data station. It has two-way connections with a mass storage section 66, with a display and keyboard section 68, with a LAN node 44, and with other input and output devices (indicated at 70), such as printers, plotters, audio or visual alarms, process control functions, remote communication functions, etc.

The node 44 in FIG. 3 has the same components as the node at each of the optical heads. And it is connected to the next-in-line computer by a section of twinax cable 42.

Figure 4:
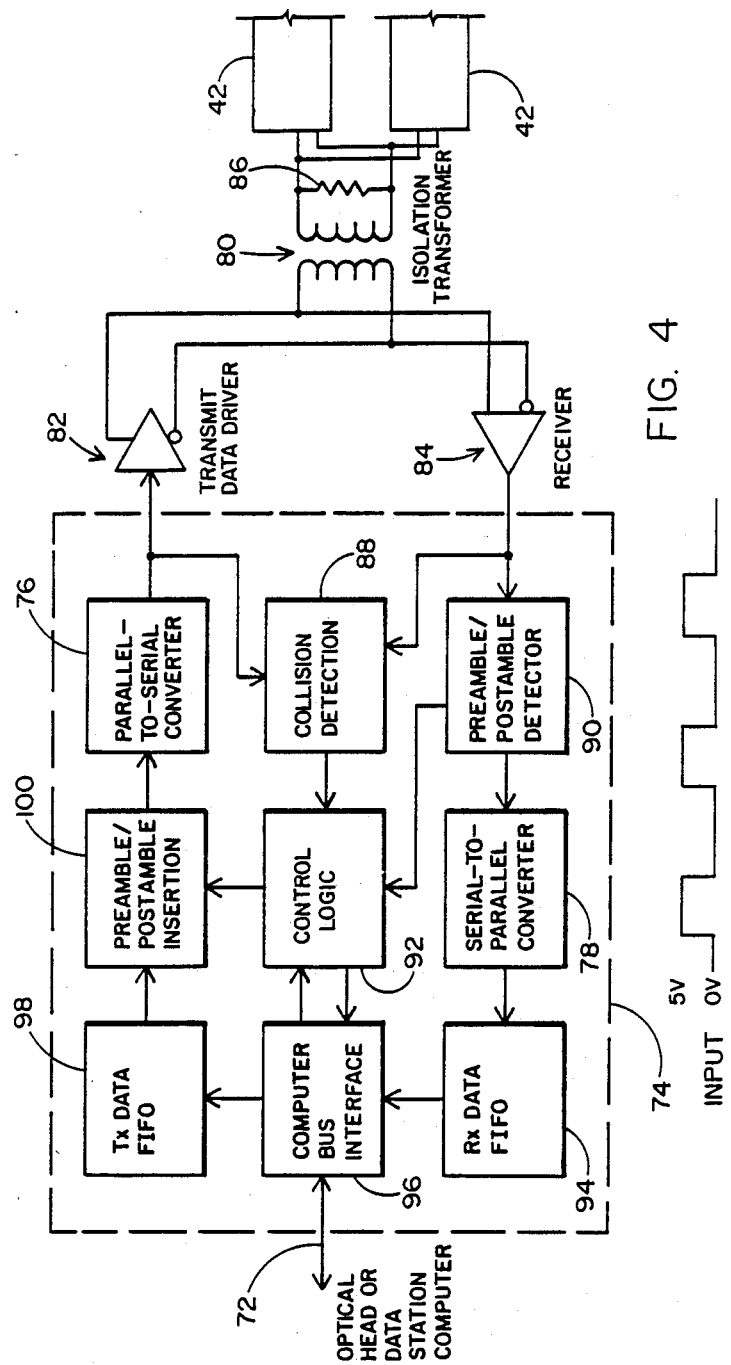
FIG. 4 shows diagrammatically a local area network (LAN) node, which permits the efficient interlinking of the optical heads and data stations included in the FIGS. 1A and 1B systems.

FIG. 4 shows the primary components of one of the LAN nodes 44, plus the interface components between the LAN node and the cable connector (or connectors) 42. Each LAN node 44 interfaces with the local computer (optical head or data station) by means of a two-way link 72 (also shown in FIG. 2).

The LAN node components shown inside the dashed line rectangle 74 are available on a single chip supplied by Intel, designated 82588 in that company's Reference Manual, which explains the functions of the 82588 controller in detail. In the LAN controller parallel-to-serial conversion of the outgoing signals from the local computer occurs at 76; and serial-to-parallel conversion of the incoming signals from a remote computer occurs at 78.

Between the computer-to-computer cable 42 and the LAN controller 74, are an isolation (coupling) transformer 80, a transmitter/driver 82, and a receiver 84. The transformer 80 serves the purpose of isolating the local node from the network of nodes. If a particular node station experiences an operational failure, the transformer will prevent it from corrupting data on the network. Such a failure usually will become known if a subsequent effort to communicate with the failed local station is unsuccessful.

The transmitter/driver 82 sends out serial signals from the local station. It amplifies the signals, and also converts them from single ended output pulses into differential output data. The receiver 84 receives incoming serial signals from the remote stations. It amplifies the signals, and also converts them from differential input data into single ended pulses entering the LAN controller 74.

The two wires A and B coming out of the isolation transformer 80 carry identical electrical signals which are 180° out of phase with one another. One of the wires carries an in phase signal train, representing the input digital words as they were put into the input of the driver 82. The other wire carries exactly the same signal train, but where the first goes high, the second goes low, and vice versa. The receiver 84 also is sensitive to the difference between the two wires A and B, not to the absolute voltages on the wires. So anything that produces an interference which is common to both wires, will be ignored by the receiver. This gives the system an additional, very significant level of noise rejection.

Figure 5:
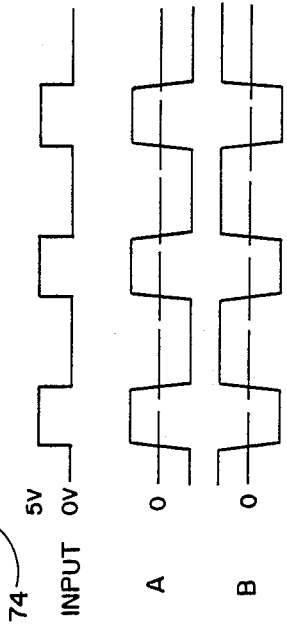
FIG. 5 is a pulse diagram illustrating the differential signal provided by the amplifiers and the cable, as a noise suppression expedient.

The differential signal effect is illustrated in FIG. 5. In the upper row, signals are shown, which vary between 0 volts and 5 volts. In the middle row, the signals on line A are shown as fluctuating on both sides of the 0 volt (dashed) line. And in the lower row, the signals on line B are shown as fluctuating (180° out of phase) on both sides of the 0 volt (dashed) line.

A termination resistor 86 is connected across transformer 80 at each of the end nodes, i.e., the two nodes which terminate the series network.

The LAN controller 74 incorporates a collision detector circuit 88. While the local station is transmitting via transmitter 82, the collision detector 88 is "listening", via receiver 84, to the received data, and is comparing the two. If it detects that something is wrong, it assumes that another station is trying to transmit at the same time, or that some kind of failure on the cable has occurred. It will then abort, and give the computer a signal indicating that something is going wrong.

The incoming bits, which have been transmitted and amplified by receiver 84, are conveyed to a preamble/postamble detector circuit 90, which sends output signals to a control logic circuit 92, and to serial-to-parallel converter 78. The preamble/postamble detector 90 determines if the present message is destined for this particular node. If it is not, then the control logic 92 ignores everything that is coming in. If there is an address as part of the preamble that is specific to this node, then the message will be passed through to the serial-to-parallel converter 78, which receives each bit, blocks the bits into 8 bit bytes, and temporarily holds the incoming data, referred to as Rx data, in a FIFO 94 (a temporary, first-in-first-out storage unit).

The control logic 92 determines when (and how much) data stored in FIFO 94 is transferred to a computer bus interface 96, and when (and how much) data from bus interface 96 is transferred into the local computer unit (link 72). Control logic 92 also determines when (and how much) data is transferred from the local computer unit into bus interface 96, and when (and how much) data is transferred from bus interface 96 to a FIFO 98. FIFO 98 temporarily stores data, referred to as Tx data, which is to be transmitted from the local computer to a remote computer via the LAN network.

As determined by control logic 92, segments of data from FIFO 98 are transferred to a preamble/postamble insertion circuit 100, which organizes the data into frames to be transmitted by driver 82, after parallel-to-serial conversion by converter 76.

The FIFOs 94 and 98 each act as buffering elements, in order to avoid tying up the computer for extended periods of time. All information segments have a sequence of bytes at the beginning of the message to identify it to the destination, and set the boundary of the message. After the message has been transmitted, attached trailing bytes are used to validate the message, and mark the end of it.

From the foregoing description, it will be apparent that the apparatus disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. A spectrometer system comprising:
   one or more digital computer data stations which control the operation of, and acquire data from, other portions of the system;
   a plurality of optical heads located remotely from the data stations, each of which optical heads includes a dedicated digital computer and a spectrometer which is controlled by, and which supplies data to, the dedicated computer, in the form of separate frames containing digital information;
   a plurality of parallel/serial data conversion nodes, a separate one of such nodes being located at each computer data station and at each dedicated computer;
   a plurality of separate serial data carrying connecting cables, each having one end connected to one node and the other end connected to the next node;

the nodes being connected to one another in series, with no node being connected to more than two other nodes;

means at each node for addressing each frame of digital information originated at that node to another node; and means at each node for rejecting any frame of digital information not addressed to that node.

2. The spectrometer system of claim 1 in which each dedicated computer node is connected to:

a receiver which directs into the computer located at that node signals from the other nodes; and a driver which sends signals from the computer located at that node to the other nodes.

3. The spectrometer system of claim 2 in which:

each receiver at each node provides amplification of the signals into the node; and each driver at each node provides amplification of the signals from the node.

4. The spectrometer system of claim 2 in which each node includes:

a serial-to-parallel converter which receives signals from said receiver connected to the node; and a parallel-to-serial converter which transmits signals to said driver connected to the node.

5. The spectrometer system of claim 2 which also comprises:

a collision detector which compares receiver-to-node signals with node-to-driver signals, and means controlled by the collision detector for providing a signal indicating system failure.

6. The spectrometer system of claim 2 in which:

the receiver and driver at each node are coupled to provide differential amplifier signal pulses both into and out of said node; and each cable has a pair of wires carrying receiver and driver signals which are 180° out of phase with one another.

7. The spectrometer system of claim 2 which also comprises:

a transformer which isolates the cables from the driver and receiver at each node.

* * * * *